United States Patent
Newcomb et al.

(10) Patent No.: US 11,358,647 B1
(45) Date of Patent: Jun. 14, 2022

(54) LOCALLY REINFORCED FOAM-FILLED COMPOSITE COMPONENTS FOR VEHICLE BODY STRUCTURES AND METHODS OF MAKING THE SAME

(71) Applicant: GM GLOBAL TECHNOLOGY OPERATIONS LLC, Detroit, MI (US)

(72) Inventors: Bradley A. Newcomb, Troy, MI (US); Julien P. Mourou, Bloomfield Hills, MI (US); Giles D. Bryer, Northville, MI (US); Joung Min Choi, Rochester Hills, MI (US); Thomas S. Prevost, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/146,774

(22) Filed: Jan. 12, 2021

(51) Int. Cl.
  *B62D 25/02* (2006.01)
  *B62D 25/04* (2006.01)
  *B62D 25/06* (2006.01)
  *B62D 29/04* (2006.01)

(52) U.S. Cl.
  CPC ............. *B62D 25/02* (2013.01); *B62D 25/04* (2013.01); *B62D 25/06* (2013.01); *B62D 29/043* (2013.01)

(58) Field of Classification Search
  CPC ...... B62D 25/04; B62D 25/02; B62D 29/001; B62D 29/002; B62D 29/043
  USPC ............ 296/187.02, 193.06, 203.01, 203.03, 296/203.02
  See application file for complete search history.

(56) References Cited

U.S. PATENT DOCUMENTS

| | | | |
|---|---|---|---|
| 4,159,144 A | 6/1979 | Ehlen et al. | |
| 4,892,351 A | 1/1990 | Ono et al. | |
| 4,988,142 A | 1/1991 | Chandler et al. | |
| 6,168,226 B1 * | 1/2001 | Wycech | B62D 29/007 296/146.6 |
| 6,817,654 B2 * | 11/2004 | Kitagawa | B62D 21/15 296/187.03 |
| 8,376,426 B2 | 2/2013 | Choi et al. | |
| 8,511,742 B2 | 8/2013 | Legler et al. | |
| 8,814,258 B2 | 8/2014 | Comfort et al. | |

(Continued)

FOREIGN PATENT DOCUMENTS

| | | | |
|---|---|---|---|
| CN | 109455229 A | * | 3/2019 |
| CN | 110696927 A | * | 1/2020 |
| JP | 2018184063 A | * | 11/2018 |

*Primary Examiner* — Dennis H Pedder
(74) *Attorney, Agent, or Firm* — Quinn IP Law

(57) ABSTRACT

Presented are structurally reinforced components for vehicle body structures, methods for making/using such components, and motor vehicles equipped with such components. A vehicle body structure includes an elongated support rail (e.g., a pair of lateral roof rails) with an inner contoured rail panel joined to an outer contoured rail panel to define an internal rail cavity. An elongated support pillar (e.g., front, side, and/or back vehicle pillars) adjoins the support rail and includes an inner contoured pillar panel joined to an outer contoured pillar panel to define an internal pillar cavity coupled to the internal rail cavity. The inner rail and pillar panels may be integrally from as a single-piece structure, and the outer rail and pillar panels may be integrally from as a single-piece structure. A structural reinforcement insert is located inside the support pillar and support rail, filling a discrete region within the rail cavity and pillar cavity.

20 Claims, 3 Drawing Sheets

(56) References Cited

U.S. PATENT DOCUMENTS

| | | | |
|---|---|---|---|
| 8,925,286 | B2 | 1/2015 | Hagen et al. |
| 8,926,004 | B2 | 1/2015 | Betzen et al. |
| 9,227,673 | B2 | 1/2016 | Berger et al. |
| 9,290,084 | B2 | 3/2016 | Bojanowski et al. |
| 9,340,096 | B2 | 5/2016 | Bojanowski |
| 9,994,091 | B2 | 6/2018 | Kaphengst et al. |
| 10,293,668 | B1 | 5/2019 | Foss et al. |
| 10,370,040 | B1* | 8/2019 | Cooper ................ B62D 21/157 |
| 2007/0182217 | A1 | 8/2007 | Saleen et al. |
| 2008/0001437 | A1* | 1/2008 | Balzer .................... B62D 25/02 |
| | | | 296/203.03 |
| 2011/0248525 | A1 | 10/2011 | Lundstroem |
| 2012/0104799 | A1* | 5/2012 | Danielson ............ B62D 29/048 |
| | | | 296/193.06 |
| 2012/0153669 | A1* | 6/2012 | Nagwanshi .......... B62D 29/005 |
| | | | 293/122 |
| 2019/0146216 | A1 | 5/2019 | Mourou et al. |

\* cited by examiner

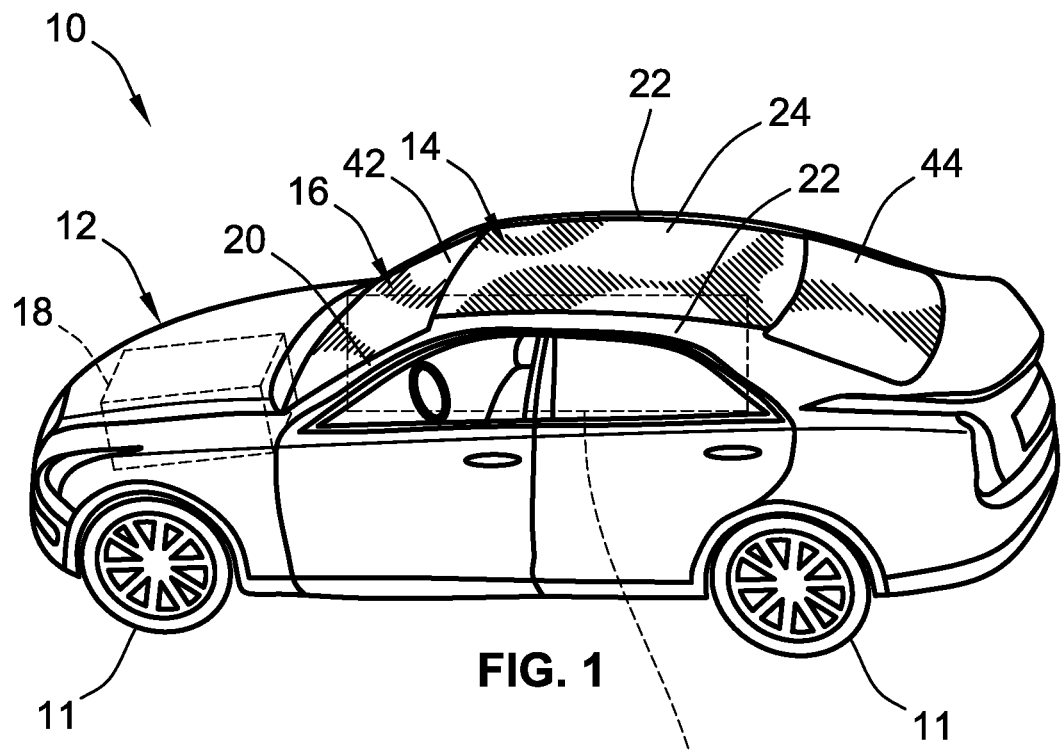
FIG. 1
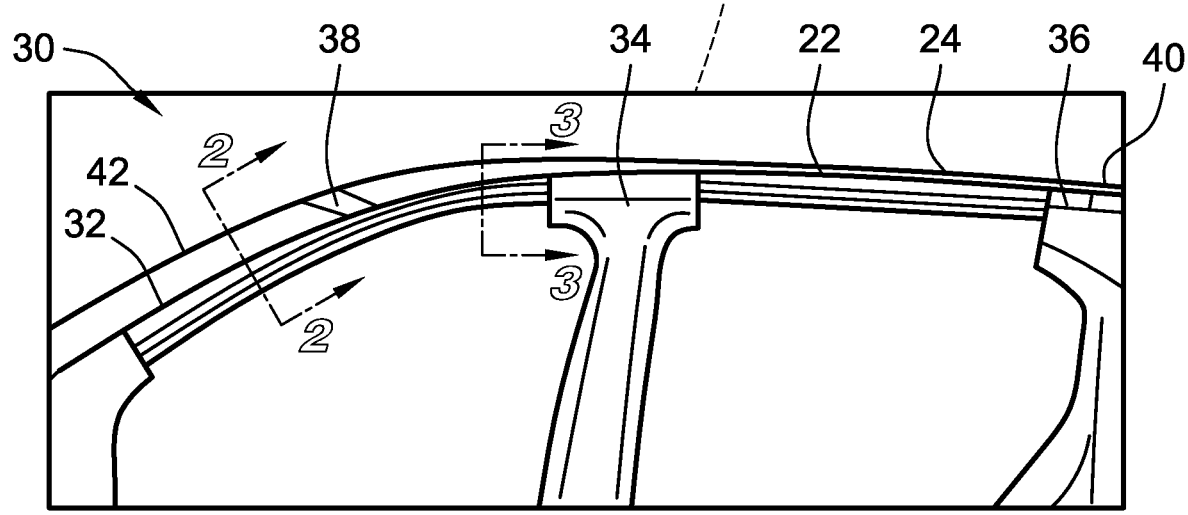

LOCALLY REINFORCED FOAM-FILLED COMPOSITE COMPONENTS FOR VEHICLE BODY STRUCTURES AND METHODS OF MAKING THE SAME

INTRODUCTION

The present disclosure relates generally to load-bearing body structures of motor vehicles. More specifically, aspects of this disclosure relate to structurally reinforced vehicle pillars and roof rails for improved loading and roof-crush performance.

Most current production motor vehicles, such as the modern-day automobile, are erected on a rigid vehicle body—either as a body-on-frame or a unibody construction—with an interior passenger compartment that seats and safeguards the vehicle occupants. Mounted between the forward A-pillars of the vehicle body is a windshield that provides an aerodynamically formed window through which the driver views the roadway while preventing unwanted ingress of wind, rain, and debris. Driver-side and passenger-side door assemblies are movably mounted between the A and B-pillars (coupes) and B and C-pillars (sedans) to provide controlled access to the passenger compartment and enable lateral visibility through accompanying door windows. A rear window or back glass is mounted between the C-pillars (three-box body designs) or D-pillars (two-box body designs) to seal off, yet provide visibility through, a rearward end of the passenger compartment. To provide extra sunlight and optional ventilation for the passenger compartment, a moonroof or sunroof assembly may be installed within the vehicle's roof structure, e.g., supported by the front and rear roof headers and lateral roof rails.

SUMMARY

Presented herein are structurally reinforced components for vehicle body structures, methods for making and methods for using such components, and motor vehicles with locally reinforced, foam-filled composite pillars and roof rails. By way of example, a vehicle upper body structure is generally typified by a load-bearing roof structure mounted on a pillar array that provides subjacent support between the roof and a lower body portion of the vehicle. The pillar array includes a pair of front (A) pillars at a forward end of the passenger compartment, a pair of rear (C) pillars at a rearward end of the passenger compartment and, depending on vehicle body type, a pair of side (B) pillars interposed between the A and C-pillars. The roof structure is generally composed of laterally spaced roof side rails adjoining top ends of the pillars, and longitudinally spaced front and rear headers defining the upper extents of front and rear windshield frames. Opposing ends of the roof headers may be mounted to flanges or inboard surfaces of the roof side rails to cooperatively define a roof frame with a central opening. A transparent laminate composite roof panel may be mounted onto the roof frame to cover the central opening, e.g., for a panoramic "glass roof" automobile.

Continuing with the preceding discussion of the representative vehicle upper body structure, each A-pillar may be fabricated as a bipartite construction from contoured fiber-reinforced polymer (FRP) inner and outer panel pieces that are joined together, e.g., via welding, clamping, fastening, etc., to define a longitudinally elongated interior cavity. Each roof rail may be fabricated as a tripartite construction with the same two FRP panel pieces joined to a third contoured FRP panel piece that is located inboard from the inner and outer panel pieces. Open aftward ends of the A-pillar cavities are connected to open forward-facing ends of the roof rail cavities and partially filled with an expanding foam filler or a honeycomb core filler. The filler may be localized to a discrete region within the upper body structure, e.g., originating at a forward roof corner, whereat the A-pillar, roof rail, and front header intersect, extending rearward through the roof rail, and terminating proximate a center of the B-pillar. The structurally reinforcing filler may place a continuous expanding pressure on interior surfaces of the inner and outer FRP panel pieces.

Attendant benefits for at least some of the disclosed concepts include locally reinforced, foam-filled composite components of vehicle body structures that exhibit improved noise, vibration, and harshness (NVH) performance. For automotive applications, hollow vehicle pillars and roof rails having selectively located internal reinforcement features provide local stiffening with limited additional vehicle mass to enable loading in a desired plane for optimal roof-crush performance. In addition to improving vehicle body integrity and NVH characteristics, disclosed features may also help to reduce overall vehicle mass by decreasing support pillar and rail mass, which in turn leads to improved fuel economy and vehicle range for HEV and FEV applications.

Aspects of this disclosure are directed to structurally reinforced components for vehicle body structures. In an example, a vehicle body structure for a motor vehicle includes one or more elongated support rails (e.g., lateral roof rails) and one or more elongated support pillars (e.g., vertical or diagonal front, side, and/or back vehicle pillars) adjoining the support rail(s). Each support rail includes an inner (first) contoured rail panel joined to an outer (second) contoured rail panel to define therebetween an internal rail cavity. Likewise, each support pillar includes an inner (first) contoured pillar panel joined to an outer (second) contoured pillar panel to define therebetween an internal pillar cavity. The internal pillar cavity is coupled to the internal rail cavity, e.g., to collectively define a continuous channel that extends through the support pillar and support rail. A structural reinforcement insert is secured inside each adjoining pillar-and-rail set, filling a discrete region within the rail cavity and the pillar cavity.

Additional aspects of this disclosure are directed to motor vehicles assembled with load-bearing upper body structures having locally reinforced, foam-filled composite pillars and roof rails. As used herein, the terms "vehicle" and "motor vehicle" may be used interchangeably and synonymously to include any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles (ATV), motorcycles, farm equipment, watercraft, aircraft, electric bicycles ("ebikes"), etc. In an example, a motor vehicle includes a vehicle body with upper and lower body structures defining a passenger compartment, multiple road wheels mounted to the vehicle body, and other standard original equipment. A prime mover, which may be in the nature of an engine assembly (e.g., for internal combustion engine (ICE) powertrains), an electric traction motor (e.g., for full-electric vehicle (FEV) powertrains), or both an engine assembly and a traction motor (e.g., for hybrid electric vehicle (HEV) powertrains), selectively drives one or more of the road wheels to thereby propel the vehicle.

Continuing with the discussion of the above example, the vehicle also includes a rigid upper body structure with a pair of elongated roof rails that extends longitudinally along a fore-aft length of the vehicle and buttresses thereon a roof panel. Each roof rail includes a pair of contoured rail panels joined together to form an internal rail cavity. A pair of elongated support pillars projects downwardly from and adjoins the roof rails to define a window frame for a front, rear, or side vehicle window. Each support pillar includes a pair of contoured pillar panels joined together to form an internal pillar cavity. Each of the pillar cavities is coupled to a respective rail cavity, e.g., to collectively form a continuous channel that extends from the support pillar into the support rail. A structural reinforcement insert is located inside each mating pillar-and-rail combo, filling a discrete region within the internal rail cavity and internal pillar cavity.

Aspects of this disclosure are also directed to manufacturing systems and methods for making any of the disclosed structurally reinforced components, load-bearing vehicle body structures, and/or motor vehicles. In an example, a method is presented for manufacturing a vehicle body structure for a motor vehicle. This representative method includes, in any order and in any combination with any of the above and below disclosed options and features: forming an elongated support rail by joining a first contoured rail panel to a second contoured rail panel to define therebetween an internal rail cavity; forming an elongated support pillar by joining a first contoured pillar panel to a second contoured pillar panel to define therebetween an internal pillar cavity; attaching the support pillar to the support rail such that the internal rail cavity is coupled to the internal pillar cavity; and locating a structural reinforcement insert inside the support pillar and the support rail such that the structural reinforcement insert fills a discrete region within the internal rail cavity and the internal pillar cavity.

For any of the disclosed body structures, methods, and vehicles, the width and height of the structural reinforcement insert may be substantially equal to the width and height, respectively, of the discrete region within the internal rail and pillar cavities, e.g., such that the insert is interference fit within the support rail and support pillar. As a further option, the discrete region is defined by at least three inward-facing surfaces of the support pillar and support rail; the structural reinforcement insert includes at least three outward-facing surfaces, each of which is seated substantially flush against a respective one of the discrete region's inward-facing surfaces. In this instance, the structural reinforcement insert may apply a substantially continuous outward pressure on the inward-facing surfaces of the discrete region. To provide localized structural reinforcement, the length of the discrete region is less than a combined length of the rail cavity and pillar cavity.

For any of the disclosed body structures, methods, and vehicles, the structural reinforcement insert may be fabricated as an elongated polymeric insert. This polymeric insert may be formed, in whole or in part, from a thermally expanding foam, an acrylonitrile butadiene styrene (ABS) material, or a polyurethane material, or any combination thereof. As yet a further option, the structural reinforcement insert may be fabricated as an elongated honeycomb insert. This honeycomb insert may be formed, in whole or in part, from a metallic material, a paper material, a thermoplastic or thermoset material, or any combination thereof.

For any of the disclosed body structures, methods, and vehicles, each support rail further includes an interior (third) contoured rail panel that is joined along one side thereof to the inner contoured rail panel and along an opposing side thereof to the outer contoured rail panel. As noted above, the motor vehicle may be an automobile with a front windshield, opposing front and rear headers, and a transparent or opaque roof panel. In this instance, the support rail is a lateral roof rail that provides subjacent support for the roof panel. In addition, the support pillar may be an A-pillar that cooperates with the front header and a lower cowl to at least partially define a window frame that provides subjacent support for the front windshield.

For any of the disclosed body structures, methods, and vehicles, the elongated support rail—the inner, outer and interior rail panels—is formed, in whole or in part, from an FRP composite material. In the same vein, the support pillar—the inner and outer pillar panels—is formed, in whole or in part, from an FRP composite material. Alternatively, one or more or all of the contoured panel pieces may be formed from a metallic material, such as stamped aluminum sheet metal. Optionally, the inner contoured rail panel may be integrally formed with the inner contoured pillar panel as a single-piece structure, and the outer contoured rail panel may be integrally formed with the outer contoured pillar sheet as another single-piece structure. FRP composite materials may be composed of carbon fibers, glass fibers, aramid fibers, basalt fibers, etc., that are arranged unidirectionally, bidirectionally, or multi-directionally within a solidified polymeric matrix.

The above summary does not represent every embodiment or every aspect of this disclosure. Rather, the above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes any and all combinations and subcombinations of the elements and features presented above and below.

BRIEF DESCRIPTION OF THE DRAWINGS

FIG. 1 is an elevated, perspective-view illustration of a representative motor vehicle with a transparent roof panel mounted on an upper body structure with locally reinforced vehicle pillars and roof rails in accordance with aspects of the present disclosure.

Figure 2:
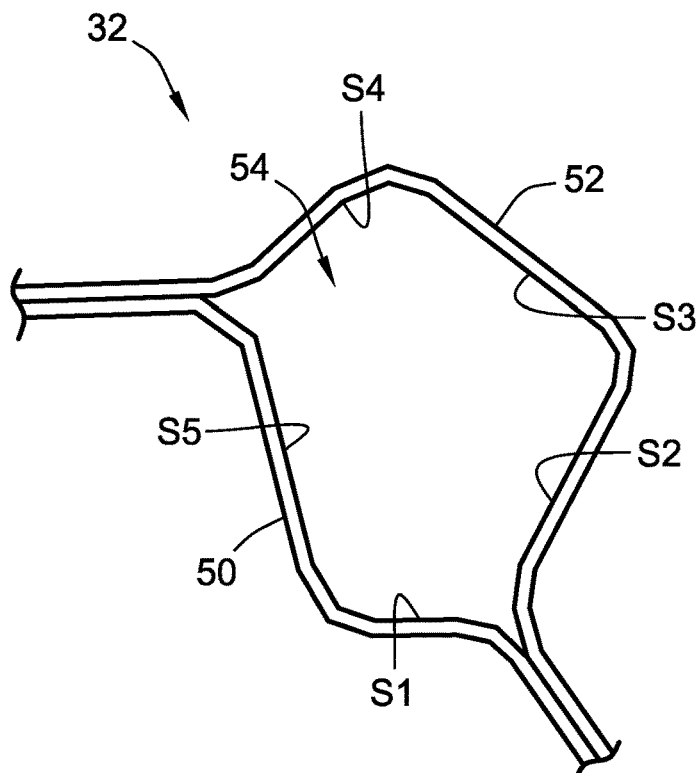
FIG. 2 is a rearward-facing, end-view illustration of a representative locally reinforced A-pillar taken in cross section along line 2-2 in the inset view of FIG. 1.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed, for instance, by the appended claims.

DETAILED DESCRIPTION

This disclosure is susceptible of embodiment in many different forms. Representative examples of the disclosure are shown in the drawings and herein described in detail with the understanding that these embodiments are provided as an exemplification of the disclosed principles, not limitations of the broad aspects of the disclosure. To that end, elements and limitations that are described, for example, in the Abstract, Introduction, Summary, Description of the Drawings, and Detailed Description sections, but not explicitly set forth in the claims, should not be incorporated into the claims, singly or collectively, by implication, inference, or otherwise. Moreover, the drawings discussed herein may not be to scale and are provided purely for instructional purposes. Thus, the specific and relative dimensions shown in the Figures are not to be construed as limiting.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and permutations thereof, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Referring now to the drawings, wherein like reference numbers refer to like features throughout the several views, there is shown in FIG. 1 a perspective-view illustration of a representative automobile, which is designated generally at 10 and portrayed herein for purposes of discussion as a sedan-style passenger vehicle with a panoramic "glass roof" assembly. The illustrated automobile 10—also referred to herein as "motor vehicle" or "vehicle" for short—is merely an exemplary application with which novel features of this disclosure may be practiced. In the same vein, incorporation of the present concepts into the A-pillars and roof rails of the vehicle's upper body structure should also be appreciated as an exemplary implementation of some of the novel concepts disclosed herein. As such, it will be understood that aspects and features of the present disclosure may be applied to other vehicle body components, may be incorporated into any logically relevant type of motor vehicle, and may be implemented for automotive and non-automotive applications alike. Moreover, only select components of the motor vehicle and vehicle body structure are shown and described in additional detail herein. Nevertheless, the vehicles and vehicle bodies discussed below may include numerous additional and alternative features, and other available peripheral components, for carrying out the various functions of this disclosure.

Automobile 10 of FIG. 1 includes a vehicle body 12 that is erected on a rigid vehicle frame 20, for example, as either a body-on-frame or a unibody construction in a three-box configuration. Front and rear road wheels 11 are operatively attached to the vehicle frame 20, e.g., via individual corner assemblies. In order to propel the vehicle, the road wheels 11 are driven by a prime mover 18, which may be in the nature of an internal combustion engine assembly and/or one or more electric traction motors. Located aft of a forward compartment (e.g., engine bay) and forward of a rear compartment (e.g., vehicle trunk) is an interior passenger compartment 16 of the vehicle body 12 that seats and safeguards the vehicle occupants. While shown as a sedan-type passenger vehicle with a three-box configuration, it should be appreciated that the vehicle 10 may take on innumerable vehicle types and vehicle-body configurations.

A rigid roof structure 14 generally delimits the upper extent of the passenger compartment 16, shielding the driver and passengers from rain, snow, ultraviolet (UV) light, and other elements. In accord with the illustrated example, the roof structure 14 is generally composed of laterally spaced roof rails 22 that are interconnected with longitudinally spaced roof headers 38 and 40 (see inset view). The roof rails 22 and roof headers 38, 40 cooperatively provide subjacent support for a roof panel 24, which may be optically transparent, translucent, opaque, or combinations thereof. The roof structure 14, including the rails 22, headers 38, 40, and roof panel 24, extends over and across the upper boundary of the passenger compartment 16. As illustrated, the transparent roof panel 24 has a "panoramic" design in that it spans across the entire fore-aft length of the vehicle roof and, thus, provides vehicle occupants with a predominantly unobstructed view through the top of the vehicle 10.

Inset within FIG. 1 is an enlarged, side-view illustration of a driver-side portion of the vehicle passenger compartment 16 shown with the vehicle doors removed to provide a more detailed look at a section of the vehicle's load-bearing upper body structure 30. The upper body structure 30 is represented in FIG. 1 by a rearwardly projecting front (A) pillar 32 at a forward end of the passenger compartment 16, a forward-leaning rear (C) pillar 36 at a rearward end of the passenger compartment 16, and a generally vertical side (B) pillar 34 interposed between the A-pillar 32 and C-pillar 36. Although not visible in the views provided, each pillar 32, 34, 36 includes a mirrored counterpart that is located on the starboard side of the vehicle passenger compartment 16 such that the body structure 30 includes six support pillars. These vehicle pillars 32, 34, 36 buttress roof structure 14 on a lower body portion of the vehicle 10 (e.g., rockers, hinge pillars, bulkhead, quarter panels, etc.). Alternative vehicle body architectures may eliminate the B-pillars 34 (e.g., for coupe-style passenger vehicles) or may include multiple side pillars (e.g., B1, B2, etc., for limousines) or a D-pillar (e.g., for sport utility vehicles and station wagons).

In addition to the rectangular array of support pillars 32, 34, 36, the upper body structure 30 of FIG. 1 is further typified by laterally spaced roof rails 22 and longitudinally spaced headers 38 and 40. The roof rails 22 are located on port and starboard sides of the passenger compartment 16 and longitudinally elongated along the fore-aft length of the vehicle 10. Located at forward and rearward ends of the roof structure 14 are the front and rear headers 38 and 40, respectively, which extend transversely across the lateral width of the roof 14. Optional cross-car reinforcement bows (not shown) may be included for supporting a standard roof panel or, conversely, may be eliminated from the roof structure 14 for supporting a panoramic "glass roof" panel. The front header 38 cooperates with the two A-pillars 32 and a front cowl panel (not shown) to define a front window frame that operatively supports thereon a front windshield 42. At the opposite end of the passenger compartment 16, the rear header 40 cooperates with the two C-pillars 36 and a rear deck panel (not shown) to define a rear window frame that operatively supports thereon a rear windshield 44.

To improve vehicle noise and vibration performance while optimizing roof-crush performance of the automobile 10, the upper body structure 30 may be manufactured with hollow FRP-composite components that are structurally reinforced with localized polymer foam or honeycomb core inserts. FIG. 2, for example, provides an end-view illustration of one of the A-pillars 32 taken in cross-section along line 2-2 in the inset view of FIG. 1. A-pillar 32 (also referred to herein as "support pillar") is assembled from two discrete non-flat pieces: an inner contoured panel 50 (also referred to herein as "first contoured pillar panel"); and an outer contoured panel 52 (also referred to herein as "second contoured pillar panel") located outboard from the inner contoured panel 50. Opposing sides of the elongated contoured panels 50, 52 are joined together to define therebetween a five-sided internal cavity 54 (also referred to herein as "internal pillar cavity"). Both contoured panels 50, 52 may be molded from a fiber-reinforced polymer (FRP) composite material, cut and stamped from a steel or aluminum sheet metal, or fabricated from other suitably rigid materials and processes. Although depicted as a two-piece construction, the A-pillar 32 may be manufactured as a one-piece tubular structure with a similarly shaped polygonal cross-section.

Figure 3:
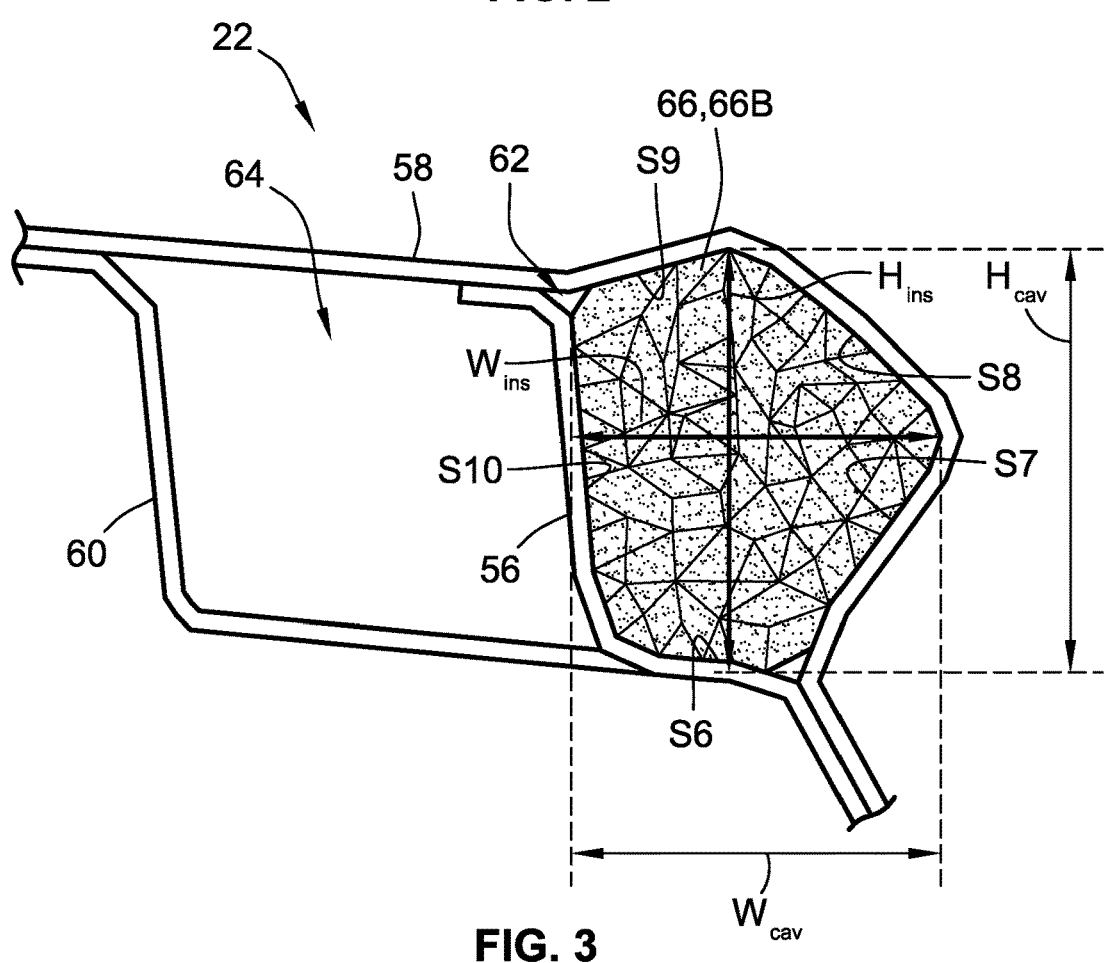
FIG. 3 is a rearward-facing, end-view illustration of a representative locally reinforced roof rail taken in cross section along line 3-3 in the inset view of FIG. 1.

FIG. 3 presents an end-view illustration of one of the roof rails 22 taken in cross-section along line 3-3 in the inset view of FIG. 1. Roof rail 22 (also referred to herein as "support rail") is assembled from three discrete non-flat pieces: an inner contoured panel 56 (also referred to herein as "first contoured rail panel"); an outer contoured panel 58 (also referred to herein as "second contoured rail panel") located outboard from the inner contoured panel 56; and an interior contoured panel 60 (also referred to herein as "third contoured rail panel") located inboard from the inner contoured panel 56. Opposing lateral sides of the elongated inner and outer contoured panels 56, 58 are joined together to define therebetween a five-sided main internal cavity 62 (also referred to herein as "internal rail cavity"). Likewise, opposing lateral sides of the interior panel 60 are joined to the inner and outer rail panels 56, 58 to define a four-sided secondary cavity 64 neighboring the main internal cavity 62. Similar to the panels 50, 52 of FIG. 2, the three contoured panels 56, 58, 60 of FIG. 3 may be fabricated from an FRP-composite material, a metallic material, or other suitable load-bearing material. Also comparable to the A-pillar 32, the roof rail 22 may be fabricated as a one, two, or three-piece construction or may include greater than the three discrete pieces portrayed in FIG. 3. What's more, the pillar 32 and rail 22 may take on other cross-section geometries and alternative dimensions.

A forward-facing end of the roof rail 22 adjoins a rearward-facing end of the A-pillar 32 such that the internal panel cavity 54 couples to the internal rail cavity 62. For applications in which roof rails 22 and A-pillars 32 are FRP-composite constructions, the inner contoured panel 50 of the A-pillar 32 may be integrally formed with the inner contoured panel 56 of the roof rail 22 as a unitary, single-piece structure. Similarly, the outer contoured panel 52 of the A-pillar 32 may be integrally formed with the outer contoured panel 58 of the roof rail 22 as a unitary, single-piece structure. In so doing, internal cavities 54, 62 may collectively fashion a continuous channel that extends the entire length of the roof rail 22 and A-pillar 32. Although described herein with respect to vehicle pillars 32, 34, 36 and roof rails 22 of a vehicle upper body structure 30, it should be appreciated that many of the localized reinforcement inserts and related features of this disclosure may be applied to other vehicle components at other vehicle locations.

Figure 4:
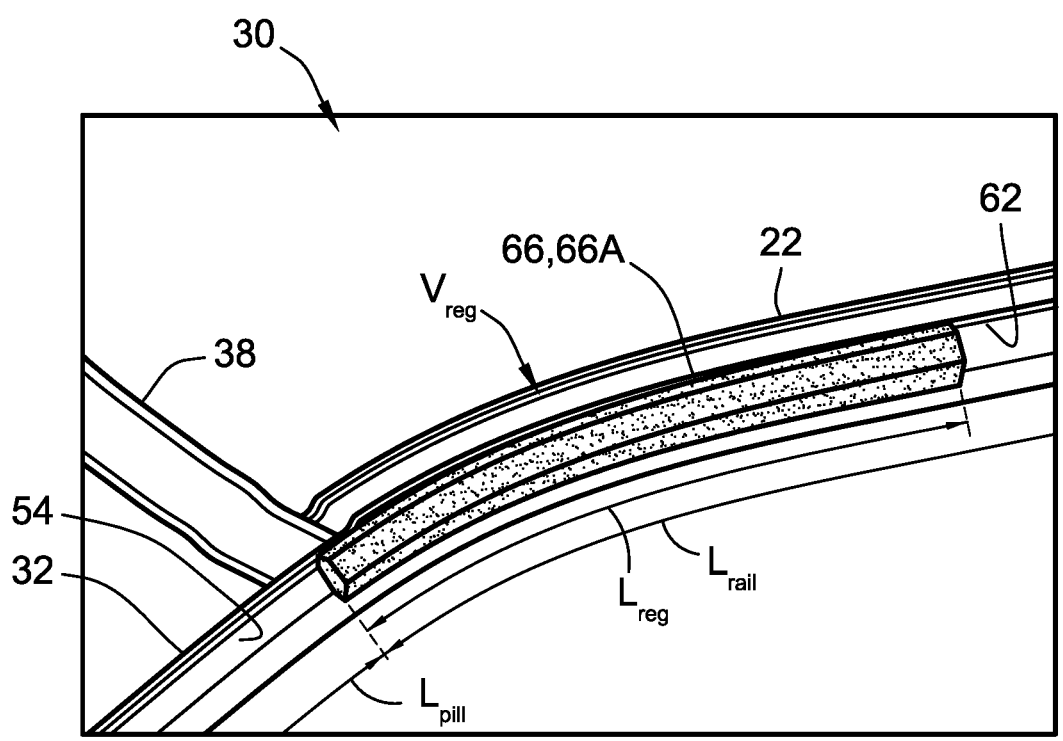
FIG. 4 is a perspective view illustration of the A-pillar and roof rail of FIGS. 2 and 3 with an outermost panel segment removed to more clearly show a representative foam filler localized to and filling a discrete region within the upper body structure.

Located inside the A-pillar 32 and roof rail 22 is a structural reinforcement insert 66 that is confined to and fills a discrete region—represented by discrete region volume $V_{reg}$—within the internal cavities 54, 62. As best seen in FIG. 4, the localized reinforcement insert 66 originates at an aftward end of the A-pillar 32 within the internal cavity 54, extends rearward through an intersection corner of the body structure 30 at which the A-pillar 32, roof rail 22, and front header 38 intersect, and terminates within the main cavity 62 of the roof rail 22 approximately halfway between the A-pillar 32 and B-pillar 34. Accordingly, a fore-aft region length $L_{reg}$ of the discrete region $V_{reg}$ filled by the structural reinforcement insert 66 is less than a combined fore-aft length of the A-pillar length $L_{pill}$ and the roof rail length $L_{rail}$. It should be appreciated, however, that the illustrated location and length $L_{reg}$ of the discrete region $V_{reg}$ filled by the insert 66 may be modified without departing from the intended scope of this disclosure.

While restricted to an isolated length of the A-pillar 32 and roof rail 22, the localized reinforcement insert 66 has sufficient girth to fill the discretized section or sections of the internal cavity 54 and main cavity 62 occupied by the insert 66. With reference back to FIG. 3, the structural reinforcement insert 66 has a lateral insert width $W_{ins}$ and a vertical insert height $H_{ins}$ that are substantially equal to a lateral cavity width $W_{cen}$, and a vertical cavity height $H_{cav}$, respectively, of the discrete region $V_{reg}$ within the internal cavities 54, 62. With these complementary dimensions, the reinforcement insert 66 occludes the internal cavities 54, 62 of the A-pillar 32 and roof rail 22. In this regard, the outermost periphery of the discrete region $V_{reg}$ is delineated by multiple inward-facing surfaces of the A-pillar 32 and roof rail 22. FIG. 2, for example, labels the five inward-facing surfaces S1-S5 of the A-pillar 22, and FIG. 3 labels the five inward-facing surfaces S6-S10 of the roof rail 22. In order to fill the discrete region $V_{reg}$ within the internal and main cavity 54, 62, each of the five outward-facing surfaces (not labelled) of the structural reinforcement insert 66 is seated substantially flush against one or more inward-facing surfaces S1-S10 of the pillar 32 and rail 22. Based on the type of insert used, the structural reinforcement insert 66 may apply a substantially continuous outward pressure (i.e., expansive force) on the inward-facing surfaces S1-S10 that define the outer periphery of the discrete region $V_{reg}$. With these features, a transverse cross-section geometry of the insert 66 is substantially identical to the transverse cross-section geometry or geometries of the sections of the internal cavities 54, 62 occupied by the insert 66.

Depending on the intended application and corresponding design constraints for the locally reinforced vehicle body component, the structural reinforcement insert 66 may take on any suitable combination of shape, size, location, and orientation. For instance, the structural reinforcement insert 66 is depicted FIG. 4 as an elongated, polyhedral shaped polymeric insert 66A. The polymeric insert 66A may be formed from a thermally expanding foam, an acrylonitrile butadiene styrene (ABS) material, or a polyurethane material, or any combination thereof. For at least some desired implementations, reinforcement insert 66A is formed in situ from a thermally expanding foam composed of a thermoset matrix material that expands when mixed with thermally expanding microspheres and subjected to a predefined expansion temperature. The epoxy or thermoset matrix in the expanding foam will crosslink and form a structural foam insert. Other suitable foam materials may be selected from a list comprising: ABS thermoplastic foams, polycarbonate foams, polystyrene foams, polypropylene foams, and poly(vinyl chloride) foams.

A method of forming a polymeric insert 66A may include inserting an epoxy mixture comprised of a thermally cured epoxy system and thermally expanding microspheres between at least two opposing component surfaces with a constant gap held therebetween. The epoxy mixture is then heated such that the expanding foam exerts an outward pressure on the interior faces of the two components. In a non-limiting example, the method includes: (1) placing the inner contoured panel(s) 50, 56 inside an oven and heating the panel(s) 50, 56 to an expansion start temperature ($T_s$); (2) mixing an epoxy with about 0.1 to about 5.0 wt % of expanding microspheres; (3) placing the epoxy mixture onto the surface of panel(s) 50, 56; (4) affixing panel(s) 52, 58 and panel 60 in place; (5) maintaining an expansion temperature ($T_{exp}$) for a predefined expansion time ($t_c$) to complete expansion of the epoxy mixture (e.g., about 20 seconds to about 10 minutes); and (6) allow the foam to complete expansion and cure. It may be desirable that no external pressure is applied to panel(s) 50, 56 and panel(s) 52, 58 during steps (1)-(5) while the elevated expansion temperature is being applied to form the foam insert. The expanding foam may exert a continuous pressure on the inward-facing surfaces of panel(s) 50, 56 and panel(s) 52, 58 during expansion process.

FIG. 3 portrays the structural reinforcement insert 66 as an elongated, polyhedral shaped honeycomb insert 66B. The honeycomb insert 66B may be formed from a metallic material, a paper material, a thermoplastic material, or any combination thereof. For at least some desired implementations, the structural reinforcement honeycomb insert 66B is a solid structure with an array of hollow cells formed between a lattice of thin, interconnected walls. The cells of the honeycomb insert 66B may be columnar and hexagonal in shape. As a result of this honeycomb shape, the insert 66B may act as an auxetic structure. In this way, when the honeycomb insert 66B is under a compressive load (e.g., in a vertically downward direction in FIG. 1), the size of the discrete region filled by the insert 66B concomitantly reduces size. This, in turn, causes the honeycomb insert 66B to become stiffer as it is compressed further due to the fact that more material 'gets in the way' of the compressive load. To make this auxetic structure functionally beneficial, an extrusion direction of a honeycomb insert 66B may be aligned with an expected direction of a roof crush force. By way of non-limiting example, a "true alignment" of the crush force may be approximately 25 degrees with respect to a global x-axis (fore-aft) and approximately 5 degrees with respect to the global y-axis (cross-car).

A method of forming a honeycomb insert 66B may include placing a paper, thermoplastic, or aluminum-based honeycomb material between at least two opposing component surfaces. While maintained at a predefined elevated temperature, an inward pressure is applied to the outermost surfaces of the two opposing components such that the honeycomb material compresses or collapses in a local region of interest. In a non-limiting example, the method includes: (1) placing the inner contoured panel(s) 50, 56 in mold; (2) heating the mold to a predefined molding temperature ($T_m$); (3) placing a solid honeycomb core onto a surface of panel(s) 50, 56 within the mold; (4) affixing panel(s) 52, 58 in place; (5) closing the mold; (6) exerting a predetermined pressure on the honeycomb to conform to a desired shape; (7) maintain an elevated temperature (e.g., molding temperature ($T_m$)) for a predetermined cure time (e.g., about 20 seconds to about 10 minutes); and (8) complete molding process. In this example, a constant pressure and elevated temperature are applied to the workpieces inside the mold. In so doing, the honeycomb core takes on the shape of the non-uniform cavity within the local region of interest. An adhesive joint may be formed between workpieces during the molding process. An adhesive joint may be formed between workpieces during the molding process.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A vehicle body structure for a motor vehicle, the vehicle body structure comprising:
   an elongated support rail including a first contoured rail panel joined to a second contoured rail panel to define therebetween an internal rail cavity, the elongated support rail further including a third contoured rail panel joined along a first side thereof to the first contoured rail panel and joined along a second side thereof to the second contoured rail panel;
   an elongated support pillar adjoining the elongated support rail and including a first contoured pillar panel joined to a second contoured pillar panel to define therebetween an internal pillar cavity coupled to the internal rail cavity; and
   a structural reinforcement insert located inside the support pillar and the support rail and filling a discrete region within the internal rail cavity and the internal pillar cavity, the structural reinforcement insert including a honeycomb structure with an insert width and an insert height equal to a cavity width and a cavity height, respectively, of the discrete region within the internal rail cavity and the internal pillar cavity.

2. The vehicle body structure of claim 1, wherein the discrete region is defined by at least five inward-facing surfaces of the support pillar and the support rail, and the structural reinforcement insert includes at least five outward-facing surfaces each seated substantially flush against one or more of the at least five inward-facing surfaces.

3. The vehicle body structure of claim 1, wherein the structural reinforcement insert applies a substantially continuous outward pressure on inward-facing surfaces of the discrete region.

4. The vehicle body structure of claim 1, wherein a region length of the discrete region is less than a combined length of the support rail and the support pillar.

5. The vehicle body structure of claim 1, wherein the structural reinforcement insert includes an elongated polymeric insert.

6. The vehicle body structure of claim 5, wherein the polymeric insert is formed from a thermally expanding foam, an acrylonitrile butadiene styrene (ABS) material, or a polyurethane material, or any combination thereof.

7. The vehicle body structure of claim 1, wherein the honeycomb structure is an elongated honeycomb insert with a polyhedral shape.

8. The vehicle body structure of claim 1, wherein the honeycomb structure is formed from a metallic material, a paper material, a thermoplastic material, or any combination thereof.

9. The vehicle body structure of claim 1, wherein the motor vehicle includes a front windshield and a roof panel, wherein the vehicle body structure further comprises front and rear headers, and wherein the support rail is a roof rail cooperatively configured with the front and rear headers to buttress the roof panel, and the support pillar is an A-pillar cooperating with the front header to at least partially define a window frame configured to buttress the front windshield.

10. The vehicle body structure of claim 1, wherein the first and second contoured rail panels and the first and second contoured pillar panels each includes a fiber-reinforced polymer (FRP) composite material.

11. The vehicle body structure of claim 1, wherein the first contoured rail panel is integrally formed with the first contoured pillar panel as a first single-piece structure, and the second contoured rail panel is integrally formed with the second contoured pillar panel as a second single-piece structure.

12. A motor vehicle comprising:
a vehicle body with an upper body structure adjoining a lower body structure; and
a prime mover mounted on the vehicle body and operable to propel the motor vehicle, wherein the upper body structure includes:
first and second elongated roof rails extending longitudinally along a fore-aft length of the motor vehicle and buttressing thereon a roof panel, the first and second roof rails each including a respective first contoured rail panel a respective second contoured rail panel joined to the respective first contoured rail panel to define therebetween a respective first or second internal rail cavity, and a respective third contoured rail panel joined along a first side thereof to the respective first contoured rail panel and along a second side thereof to the respective second contoured rail panel;
first and second elongated support pillars projecting downwardly from and adjoining the first and second roof rails, respectively, to define a window frame, the first and second support pillars each including a respective first contoured pillar panel joined to a respective second contoured pillar panel to define therebetween a respective first or second internal pillar cavity, wherein the first internal pillar cavity is coupled to the first internal rail cavity, and the second internal pillar cavity is coupled to the second internal rail cavity;
a first structural reinforcement insert located inside the first support pillar and the first roof rail and filling a first discrete region within the first internal rail cavity and the first internal pillar cavity; and
a second structural reinforcement insert located inside the second support pillar and the second roof rail and filling a second discrete region within the second internal rail cavity and the second internal pillar cavity,
wherein each of the first and second structural reinforcement inserts includes a respective honeycomb structure with an insert width and an insert height equal to a cavity width and a cavity height, respectively, of the first and second discrete regions.

13. A method of manufacturing a vehicle body structure for a motor vehicle, the method comprising:
forming an elongated support rail by joining a first contoured rail panel to a second contoured rail panel to define therebetween an internal rail cavity, and joining a third contoured rail panel along a first side thereof to the first contoured rail panel and along a second side thereof to the second contoured rail panel;
forming an elongated support pillar by joining a first contoured pillar panel to a second contoured pillar panel to define therebetween an internal pillar cavity;
attaching the support pillar to the support rail such that the internal rail cavity is coupled to the internal pillar cavity; and
locating a structural reinforcement insert inside the support pillar and the support rail such that the structural reinforcement insert fills a discrete region within the internal rail cavity and the internal pillar cavity, the structural reinforcement insert including a honeycomb structure with an insert width and an insert height equal to a cavity width and a cavity height, respectively, of the discrete region within the internal rail cavity and the internal pillar cavity.

14. The method of claim 13, wherein the discrete region is defined by at least three inward-facing surfaces of the support pillar and the support rail, and the structural reinforcement insert includes at least three outward-facing surfaces each seated substantially flush against one or more of the at least three inward-facing surfaces.

15. The method of claim 13, wherein a region length of the discrete region is less than a combined length of the support rail cavity and the support pillar.

16. The method of claim 13, wherein the structural reinforcement insert includes both an elongated polymeric insert and an elongated honeycomb insert.

17. The method of claim 13, wherein attaching the support pillar to the support rail includes integrally forming the first contoured rail panel with the first contoured pillar panel as a first single-piece fiber-reinforced polymer (FRP) structure, and integrally forming the second contoured rail panel with the second contoured pillar panel as a second single-piece FRP structure.

18. The method of claim 13, wherein the structural reinforcement insert, once located inside the support pillar and the support rail, applies a substantially continuous outward pressure on inward-facing surfaces of the discrete region.

19. The method of claim 13, wherein the honeycomb structure is formed from a metallic material, a paper material, a thermoplastic material, or any combination thereof.

20. The method of claim 13, wherein the honeycomb structure is an elongated honeycomb insert with a polyhedral shape.

* * * * *